(12) United States Patent
Chae et al.

(10) Patent No.: US 12,080,270 B2
(45) Date of Patent: Sep. 3, 2024

(54) METHOD AND APPARATUS FOR TEXT-BASED SPEECH SYNTHESIS

(71) Applicant: DEEPBRAIN AI INC., Seoul (KR)

(72) Inventors: Gyeongsu Chae, Seoul (KR); Dalhyun Kim, Incheon (KR)

(73) Assignee: DEEPBRAIN AI INC., Seoul (KR)

( * ) Notice: Subject to any disclaimer, the term of this patent is extended or adjusted under 35 U.S.C. 154(b) by 77 days.

(21) Appl. No.: 17/763,337

(22) PCT Filed: Dec. 22, 2020

(86) PCT No.: PCT/KR2020/018935
§ 371 (c)(1),
(2) Date: Mar. 24, 2022

(87) PCT Pub. No.: WO2022/065603
PCT Pub. Date: Mar. 31, 2022

(65) Prior Publication Data
US 2022/0366890 A1 Nov. 17, 2022

(30) Foreign Application Priority Data

Sep. 25, 2020 (KR) .................. 10-2020-0124664

(51) Int. Cl.
*G10L 13/033* (2013.01)
*G06F 40/12* (2020.01)
(Continued)

(52) U.S. Cl.
CPC .............. *G10L 13/08* (2013.01); *G06F 40/12* (2020.01)

(58) Field of Classification Search
CPC ....... G10L 19/16; G10L 13/086; G10L 13/02; G10L 19/00; G10L 13/06; G10L 13/08; G10L 13/04
See application file for complete search history.

(56) References Cited

U.S. PATENT DOCUMENTS

| | | | | |
|---|---|---|---|---|
| 6,101,470 A | * | 8/2000 | Eide | ........................ G10L 13/10 704/260 |
| 7,558,732 B2 | * | 7/2009 | Kustner | .................. G10L 13/08 704/260 |

(Continued)

FOREIGN PATENT DOCUMENTS

| | | |
|---|---|---|
| JP | 2002-132282 A | 5/2002 |
| JP | 2015-219735 A | 12/2015 |

(Continued)

OTHER PUBLICATIONS

Office action issued on Nov. 28, 2022 from Korean Patent Office in a counterpart Korean Patent Application No. 10-2022-0049411 (English translation is also submitted herewith.).

(Continued)

*Primary Examiner* — Olujimi A Adesanya
(74) *Attorney, Agent, or Firm* — The PL Law Group, PLLC (57) ABSTRACT

An apparatus for synthesizing speech according to an embodiment is a computing apparatus that includes one or more processors and a memory storing one or more programs executed by the one or more processors. The apparatus for synthesizing speech includes a pre-processing module that marks a preset classification symbol on each of unit texts input; and a speech synthesis module that receives each unit text marked with the classification symbol and synthesizes speech uttering the unit text based on the input unit text.

12 Claims, 4 Drawing Sheets

(51) Int. Cl.
*G10L 13/047* (2013.01)
*G10L 13/08* (2013.01)

(56) References Cited

U.S. PATENT DOCUMENTS

| | | | | |
|---|---|---|---|---|
| 8,571,871 | B1* | 10/2013 | Stuttle | G10L 13/033 |
| | | | | 704/260 |
| 2003/0135356 | A1* | 7/2003 | Ying | G06F 40/211 |
| | | | | 704/1 |
| 2009/0048843 | A1* | 2/2009 | Nitisaroj | G10L 15/1807 |
| | | | | 704/260 |
| 2009/0076819 | A1* | 3/2009 | Wouters | G10L 13/07 |
| | | | | 704/260 |
| 2009/0150157 | A1* | 6/2009 | Kagoshima | G10L 13/08 |
| | | | | 704/E13.011 |
| 2009/0201176 | A1* | 8/2009 | Shimada | G01C 21/20 |
| | | | | 340/944 |
| 2011/0202344 | A1* | 8/2011 | Meyer | G10L 13/04 |
| | | | | 704/260 |
| 2019/0122651 | A1* | 4/2019 | Arik | G10L 13/08 |
| 2020/0066251 | A1* | 2/2020 | Kumano | G10L 13/10 |
| 2020/0394998 | A1* | 12/2020 | Kim | G06N 3/08 |
| 2021/0035551 | A1* | 2/2021 | Stanton | G10L 13/04 |
| 2021/0142783 | A1* | 5/2021 | Kim | G10L 13/047 |

FOREIGN PATENT DOCUMENTS

| | | |
|---|---|---|
| KR | 10-2015-0030337 A | 3/2015 |
| KR | 10-2018-0077847 A | 7/2018 |
| KR | 10-2019-0085883 A | 7/2019 |
| KR | 10-2057926 B1 | 12/2019 |
| KR | 10-2057927 B1 | 12/2019 |
| KR | 10-2020-0056261 A | 5/2020 |

OTHER PUBLICATIONS

"The wise NLP life, and the Classification—[6] One-Hot Encoding, Bag of Word", (Blog web page), <https://vhrehfdl.tistory.com/8> Aug. 23, 2020. English machine translation is submitted herewith.
Office action issued on Oct. 13, 2021 from Korean Patent Office in a counterpart Korean Patent Application No. 10-2020-0124664 (all the cited references are listed in this IDS.) (English translation is also submitted herewith.).

* cited by examiner

METHOD AND APPARATUS FOR TEXT-BASED SPEECH SYNTHESIS

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2020/018935, filed Dec. 22, 2020, which claims priority to the benefit of Korean Patent Application No. 10-2020-0124664 filed on Sep. 25, 2020 the entirety the entire contents of which are incorporated herein by reference.

BACKGROUND

1. Technical Field

Embodiments of the present invention relate to speech synthesis technology.

2. Background Art

In the conventional method for synthesizing speech based on concatenation in units of phonemes or phoneme-based modeling, since speech synthesis is possible only when the tone or prosody (e.g., stress, speed, volume, etc.) of a speaker is constant, a voice suitable for speech synthesis needs to be carefully selected and the result of speech synthesis is also monotonous and unnatural, which is problematic.

On the other hand, in deep learning-based speech synthesis, in which an artificial neural network detects and learns a relationship between text and speech given in units of sentences, it is possible to learn speaker's speech data with more diverse characteristics to reproduce the speaker's way of speaking. In this case, learning is not done only in units of sentences, and due to resource constraints of a computer, when a length of a sentence is long, learning may be done by dividing the sentence into several parts, and when the length of a sentence is short, learning may be done by concatenating several sentences.

However, there is a problem in that it is difficult to perform stable model training as speech of a speaker, whose speech characteristics (e.g., speech speed, volume, pitch deviation, etc.) are large, especially when the speech characteristics changes greatly depending on the context (e.g., the beginning part of a sentence, a part within a sentence that continues through various conjunctions, a part where the content continues in another sentence, etc.), and unnatural cases frequently occur when the synthesis results are concatenated.

SUMMARY

The disclosed embodiment is to provide a method and apparatus for text-based speech synthesis capable of synthesizing speech by reflecting speech characteristics according to a speaker's context.

An apparatus for synthesizing speech according to a disclosed embodiment is a computing apparatus that includes one or more processors and a memory storing one or more programs executed by the one or more processors, the apparatus for synthesizing speech including a pre-processing module that marks a preset classification symbol on each of unit texts input and a speech synthesis module that receives each unit text marked with the classification symbol and synthesizes speech uttering the unit text based on the input unit text.

The pre-processing module may include a classification unit that classifies at least one of a position within a sentence and a relationship between sentences for each of unit texts input and a classification marking unit that marks the classification symbol on each unit text according to the position within the sentence or the relationship between the sentences of each of the unit texts.

The classification unit may classify the position within the sentence with respect to a beginning part and an end part of the unit text, and the classification marking unit may mark the classification symbol at the beginning part and the end part of the unit text.

The unit text is obtained by dividing a sentence into several parts, and the classification marking unit may omit the classification symbol according to the position within the sentence of the unit text.

The speech synthesis module may include an encoder that receives each of unit texts marked with the classification symbol and generates an embedding vector for each of the unit texts received and a decoder that synthesizes speech for each unit text based on the embedding vector for each of the unit texts.

The apparatus for synthesizing speech may further include an attention unit that receives an embedding vector for each unit text from the encoder and generates an attention map by determining an attention weight for each unit text based on the embedding vector, and the decoder may receive an embedding vector and an attention map for each unit text from the attention unit, and synthesize speech for each unit text based on the embedding vector and the attention map.

An apparatus for synthesizing speech according to another disclosed embodiment is a computing apparatus that includes one or more processors and a memory storing one or more programs executed by the one or more processors, the apparatus for synthesizing speech including a pre-processing module that generates classification mark information for each of unit texts input and a speech synthesis module that receives each of the unit texts and classification mark information for each unit text and synthesizes speech uttering the unit text based on each of the unit texts and the classification mark information.

The pre-processing module may include a classification unit that classifies at least one of a position within a sentence and a relationship between sentences for each of the unit texts input and a classification marking unit that generates the classification mark information according to the position within the sentence or the relationship between the sentences of each of the unit texts.

The classification unit may classify the position within the sentence with respect to a beginning part and an end part of the unit text, and the classification marking unit may generate the classification mark information with respect to the start part and the end part of the unit text.

The speech synthesis module may include a first encoder that receives each of the unit texts and generates a first embedding vector for each of the unit texts, a second encoder that receives classification mark information for each of the unit texts and generates a second embedding vector for the classification mark information, a combining unit that generates a combination vector by combining the first embedding vector and the second embedding vector, and a decoder that synthesizes speech for each of the unit texts based on the combination vector.

The classification mark information is indexed according to the classified position within the sentence or relationship between sentences, and the second encoder may generate a one-hot encoding vector for the classification mark information of each of the unit texts, and generate the second embedding vector by embedding the one-hot encoding vector.

The apparatus for synthesizing speech may further include an attention unit that receives the combination vector for each unit text from the combining unit, and generate an attention map by determining an attention weight for each unit text received, and the decoder may receive a combination vector and an attention map for each unit text from the attention unit, and synthesize speech for each unit text based on the combination vector and the attention map.

A method for synthesizing speech according to a disclosed embodiment performed on a computing apparatus that include) one or more processors and a memory storing one or more programs executed by the one or more processors, the method including an operation of displaying a preset classification symbol on each of unit texts input and an operation of receiving each unit text marked with the classification symbol and synthesizing speech uttering the unit text based on the input unit text.

A method for synthesizing speech according to another disclosed embodiment performed on a computing apparatus that includes one or more processors and a memory storing one or more programs executed by the one or more processors, the method including an operation of generating classification mark information for each of unit texts input and an operation of receiving each of the unit texts input and classification mark information for each unit text, and synthesizing speech uttering the unit text based on each of the unit texts and the classification mark information.

According to the disclosed embodiment, by classifying the position within a sentence and the relationship between sentences of each unit text and performing classification marking in the pre-processing module, and then inputting each unit text into the speech synthesis module, the speech synthesis module can be trained to synthesize speech of a predetermined speaker according to the position within the sentence and relationship between the sentences of each unit text. Accordingly, it is possible to produce a natural speech synthesis result by well reflecting the speech characteristics according to the context of the corresponding speaker (e.g., speech speed, volume, pitch deviation, etc.).

DETAILED DESCRIPTION

Hereinafter, a specific embodiment of the present disclosure will be described with reference to the drawings. The following detailed description is provided to aid in a comprehensive understanding of the methods, apparatus and/or systems described herein. However, this is illustrative only, and the present disclosure is not limited thereto.

In describing the embodiments of the present disclosure, when it is determined that a detailed description of related known technologies related to the present disclosure may unnecessarily obscure the subject matter of the present disclosure, a detailed description thereof will be omitted. In addition, terms to be described later are terms defined in consideration of functions in the present disclosure, which may vary according to the intention or custom of users or operators. Therefore, the definition should be made based on the contents throughout this specification. The terms used in the detailed description are only for describing embodiments of the present disclosure, and should not be limiting. Unless explicitly used otherwise, expressions in the singular form include the meaning of the plural form. In this description, expressions such as "comprising" or "including" are intended to refer to certain features, numbers, steps, actions, elements, some or combination thereof, and it is not to be construed to exclude the presence or possibility of one or more other features, numbers, steps, actions, elements, some or combinations thereof, other than those described.

In the following description, the terms "transfer", "communication", "transmission", "reception" and other terms with similar meanings include not only direct transmission of a signal or information from one component to another component, but also transmission through another component. In particular, "transferring" or "transmitting" a signal or information to a component indicates the final destination of the signal or information and does not mean a direct destination. The same is true for "reception" of the signal or information. In addition, in this specification, when two or more data or information are "related", it means that when one data (or information) is acquired, at least a part of the other data (or information) can be acquired based thereon.

In addition, terms such as the first and second may be used to describe various components, but the components should not be limited by the terms. The above terms may be used for the purpose of distinguishing one component from another component. For example, without departing from the scope of the present disclosure, a first component may be referred to as a second component, and similarly, the second component may also be referred to as the first component.

Figure 1:
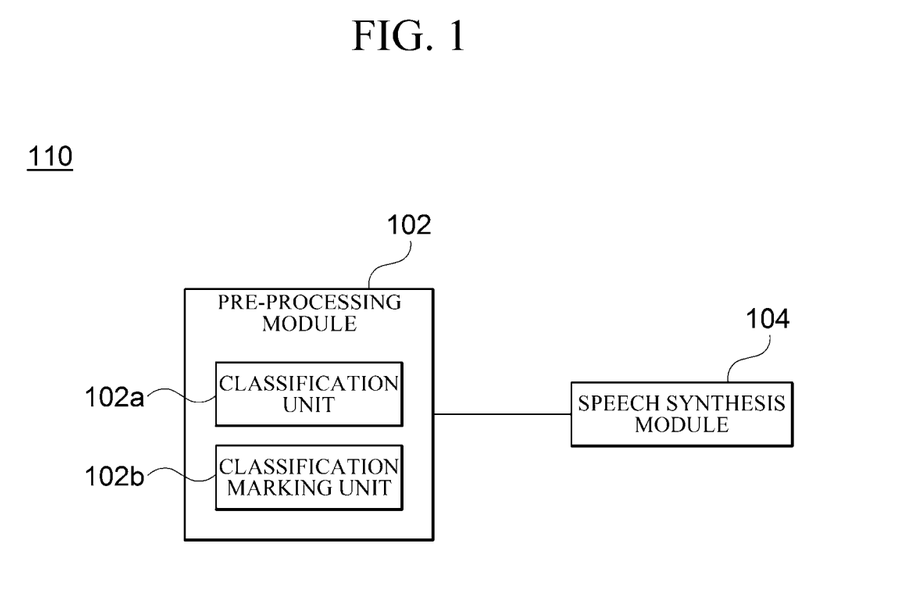
FIG. 1 is a diagram illustrating a configuration of an apparatus for synthesizing speech using text according to an embodiment of the present invention.

FIG. 1 is a diagram illustrating a configuration of an apparatus for synthesizing speech using text according to an embodiment of the present invention.

Referring to FIG. 1, an apparatus for synthesizing speech 100 may include a pre-processing module 102 and a speech synthesis module 104.

The apparatus for synthesizing speech 100 may synthesize speech from input text based on a machine learning technique using an artificial neural network. Hereinafter, a training process for synthesizing speech from input text will be mainly described.

In addition, the configuration of the apparatus for synthesizing speech 100 illustrated in FIG. 1 represents functionally divided functional elements, and the functional elements may be functionally connected to each other in order to perform the function according to the present invention, and any one or more components may be physically integrated with each other and implemented.

The pre-processing module 102 may include a classification unit 102a and a classification marking unit 102b. The classification unit 102a may classify a position in a sentence of each unit text input. That is, the classification unit 102a may classify in which part sentence (e.g., the beginning part of the sentence, the middle part of the sentence, the end part of the sentence, etc.) each unit text input is positioned in the corresponding.

Here, the unit text may be one that is obtained by dividing the sentence into several parts, but is not limited thereto, and be one that is obtained by concatenating several sentences. The unit text may be provided such that, when speech is synthesized based on the unit text, the length of synthesized speech has a preset time length.

In an exemplary embodiment, the classification unit 102a may classify in which part the beginning part and the end part of the unit text are positioned in the corresponding sentence with respect to the unit text input, but the present invention is not limited thereto.

In addition, the classification unit 102a may classify the relationship between sentences of each unit text input. That is, the classification unit 102a may classify the relationship between sentences regarding what kind of relationship each unit text input has with other sentences (e.g., the previous sentence or the next sentence, etc.).

Specifically, the classification unit 102a may classify the relationship between sentences, such as whether the unit text input is in a continuous relationship with the content of the previous sentence, whether the unit text input is in a relationship in which a new content completely different from the content of the previous sentence starts, whether the unit text input is in a relationship to additionally explain the content of the previous sentence, whether the unit text input is in a relationship to repeatedly explain the content of the previous sentence, etc., in relation to the previous sentence.

In an exemplary embodiment, the classification unit 102a may decompose each unit text input into a specific unit such as a morpheme or a syllable, and then classify the position within the sentence and the relationship between the sentences of the unit text, using a natural language processing algorithm or a machine learning model.

The classification marking unit 102b may perform classification marking on the position within the sentence and the relationship between sentences classified by the classification unit 102a. That is, the classification marking unit 102b may perform classification marking on the classified position within the sentence and relationship between the sentences of each unit text. The classification marking unit 102b may perform classification marking on the classified position within the sentence and relationship between sentences by using a preset classification symbol. In an exemplary embodiment, the classification symbol may include, but is not limited to, letters (e.g., alphabets, Greek letters, Roman letters, etc.), numbers, symbols, etc.

In an exemplary embodiment, it is assumed that a sentence (i.e., a sentence for speech synthesis) input to the apparatus for synthesizing speech 100 is "speech is . . . and sometimes . . . do, eventually . . . do". In addition, it is assumed that this sentence is divided into a first unit text of "speech is . . . and", a second unit text of "sometimes . . . do", and a third unit text of "eventually . . . do" and input to the apparatus for synthesizing speech 100.

Here, the classification unit 102a may classify a part "speech is", which is the beginning part of the first unit text, as a sentence beginning part, and classify a part, "and", which is the end part of the first unit text, as a sentence middle part. The classification marking unit 102b may perform classification marking on the first unit text as "s speech is . . . and m". In this case, s may be a classification symbol for marking the sentence beginning part, and m may be a classification symbol for marking the sentence middle part.

The classification unit 102a may classify a part "sometimes", which is the beginning part of the second unit text, as the sentence middle part, and classify a part "do", which is the end part of the second unit text, as the sentence middle part. The classification marking unit 102b may perform classification marking with "m sometimes . . . do m" for the second unit text.

The classification unit 102a may classify a part "eventually", which is the beginning part of the third unit text, as the sentence middle part, and classify a part "do", which is the end part of the third unit text, as the sentence end part. The classification marking unit 102b may perform classification marking with "m eventually . . . do e" for the third unit text. In this case, e may be a classification symbol for marking the end part of a sentence.

The classification marking unit 102b may omit marking of the classification symbol according to the position within the sentence of the unit text. For example, when the beginning part of the unit text is the sentence beginning part, the classification marking unit 102b may omit the classification symbol s without marking a separate classification symbol.

In addition, when the end part of the unit text is the sentence end part and there is a punctuation mark (e.g., period (.) or question mark (?), etc.) at the end part of the unit text, the classification marking unit 102b may omit the classification symbol e without marking a separate classification symbol.

Meanwhile, the classification marking unit 102b may also perform classification marking with a preset classification symbol for the relationship between sentences of the unit text. For example, when the relationship between sentences of the unit text is a relationship in which new contents starts, the classification symbol may be marked as n. When the relationship between sentences of the unit text is a relationship in which the content continues, the classification symbol may be marked as c.

The speech synthesis module 104 may receive each unit text in which a classification symbol is marked, and synthesize speech obtained through utterance of each unit text by a predetermined speaker based on each unit text input. The speech synthesis module 104 may be trained to synthesize speech uttered from the unit text in which the classification symbol is marked based on a machine learning technique using an artificial neural network.

Figure 2:
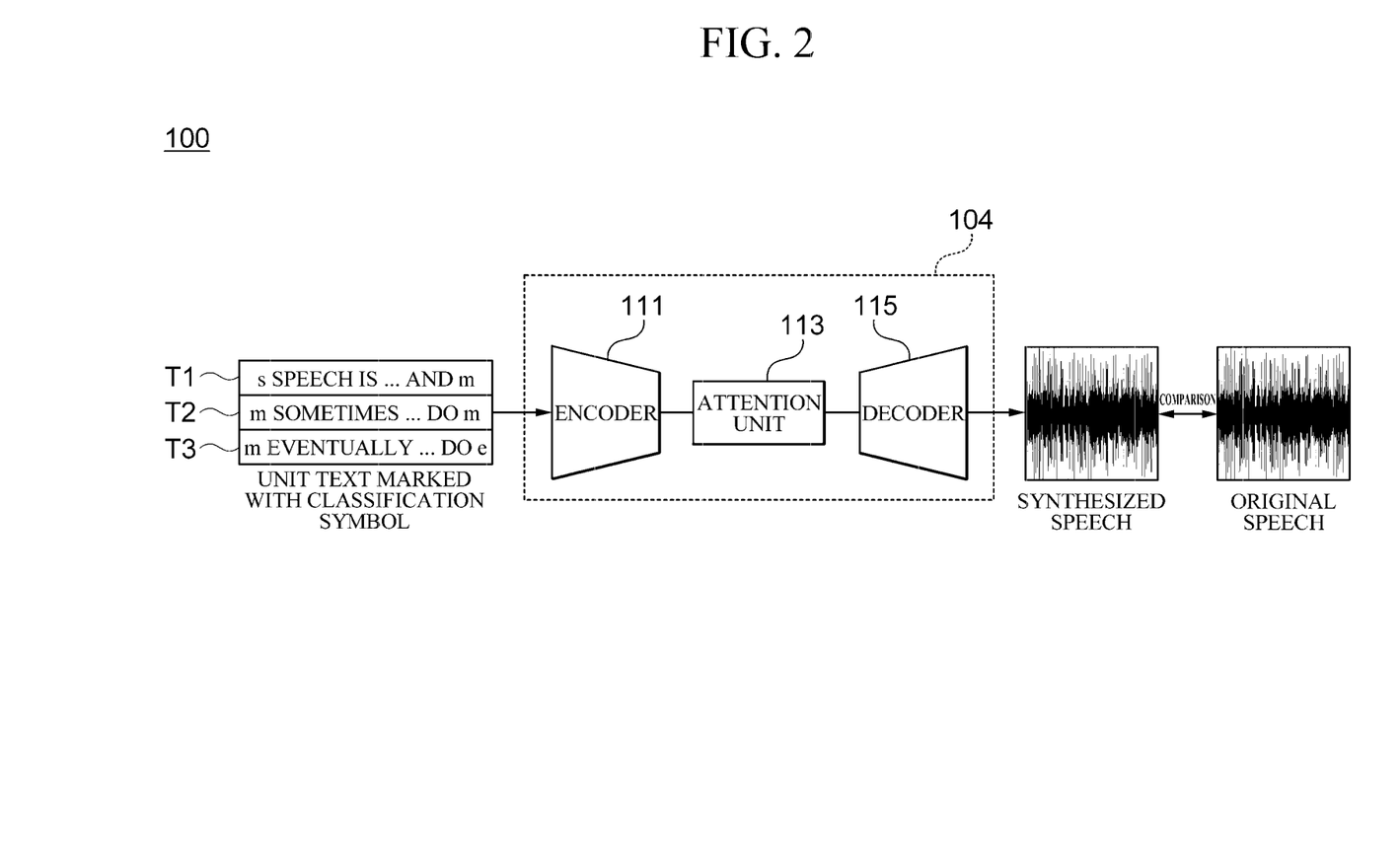
FIG. 2 is a diagram illustrating a configuration of a speech synthesis module according to an embodiment of the present invention.

FIG. 2 is a diagram illustrating the configuration of the speech synthesis module 104 according to an embodiment of the present invention. Referring to FIG. 2, the speech synthesis module 104 may include an encoder 111, an attention unit 113, and a decoder 115.

Here, an embodiment of the artificial neural network configuration of the speech synthesis module 104 is illustrated, and the artificial neural network configuration of the speech synthesis module 104 is not limited thereto. That is, the speech synthesis module 104 may be implemented through various other artificial neural network configurations.

The encoder 111 may receive each unit text in which a classification symbol is marked (e.g., a first unit text T1, a second unit text T2, and a third unit text T3). In an exemplary embodiment, the encoder 111 may divide each unit text in which the classification symbol is marked into tokens of a preset division unit, and generate a token sequence including a plurality of divided tokens.

Here, the division unit may be a morpheme unit. That is, each token included in the token sequence may be each morpheme included in the unit text. The encoder 111 may perform morphological analysis on each unit text input to divide each unit text in units of morphemes. However, the present invention is not limited thereto, and the division unit may be a syllable or the like.

The encoder 111 may generate an embedding vector based on a token sequence for each unit text. That is, the encoder 111 may generate an embedding vector that is a vector of a preset dimension, based on the token sequence for each unit text.

When an embedding vector for each unit text is input from the encoder 111, the attention unit 113 may generate an attention map by determining an attention weight for each unit text. The attention unit 113 may output the embedding vector and the attention map for each unit text to the decoder 115.

That is, when an embedding vector for each unit text is input, the attention unit 113 may generate an attention map by determining an attention weight for which part (i.e., which token) of the embedding vector of each unit text to focus attention on. Since such an attention mechanism is a known technology, a detailed description thereof will be omitted.

The decoder 115 may synthesize and output speech for each unit text based on the attention map and the embedding vector for each unit text. The decoder 115 may compare synthesized speech with original speech (i.e., speech obtained by uttering each unit text by a predetermined speaker) and adjust training parameters (e.g., loss function, softmax function, etc.) so that the synthesized speech approximates the original speech.

According to the disclosed embodiment, by classifying the position within the sentence and the relationship between sentences of each unit text and performing classification marking thereon in the pre-processing module 102, and then inputting each unit text into the speech synthesis module 104, the speech synthesis module 104 can be trained to synthesize speech of a predetermined speaker according to the position within the sentence and relationship between the sentences of each unit text. Accordingly, it is possible to produce a natural speech synthesis result by well reflecting the speech characteristics (e.g., speech speed, volume, pitch deviation, etc.) according to the context of the corresponding speaker.

In this specification, a module may mean a functional and structural combination of hardware for performing the technical idea of the present invention and software for driving the hardware. For example, the "module" may mean a logical unit of a predetermined code and a hardware resource for executing the predetermined code, and does not necessarily mean physically concatenated codes or a single type of hardware.

Meanwhile, description has been made herein that each unit text includes a classification symbol and is input to the speech synthesis module 104, but is not limited thereto, and the unit text and classification mark information may be separately input into the speech synthesis module 104.

Here, the classification marking unit 102b may generate classification mark information about a position within a sentence and a relationship between sentences of each unit text. The classification marking unit 102b may generate classification mark information by assigning an index to the position within the sentence and the relationship between sentences of each unit text.

In an exemplary embodiment, the classification marking unit 102b may assign an index of 1 to the sentence beginning part and an index of 2 to the sentence middle part, with respect to the position within the sentence of the beginning part of each unit text. In addition, the classification marking unit 102b may assign an index of 1 to the sentence middle part and an index of 2 to the sentence end part, with respect to the position within the sentence of the end part of each unit text.

Since the part "speech is", which is the beginning part of the first unit text, is classified as the sentence beginning part, and the part, "and", which is the end part of the first unit text, is classified as the sentence middle part, the classification marking unit 102b may assign an index of (1, 1) to the first unit text.

Since the part "sometimes", which is the beginning part of the second unit text, is classified as the sentence middle part, and the part "do", which is the end part of the second unit text is classified as the sentence middle part, the classification marking unit 102b may assign an index of (2, 1) to the second unit text.

Since the part "eventually", which is the beginning part of the third unit text, is classified as the sentence middle part, and the part "do", which is the end part of the third unit text, is classified as the sentence end part, the classification marking unit 102b may assign an index of (2, 2) to the third unit text.

Figure 3:
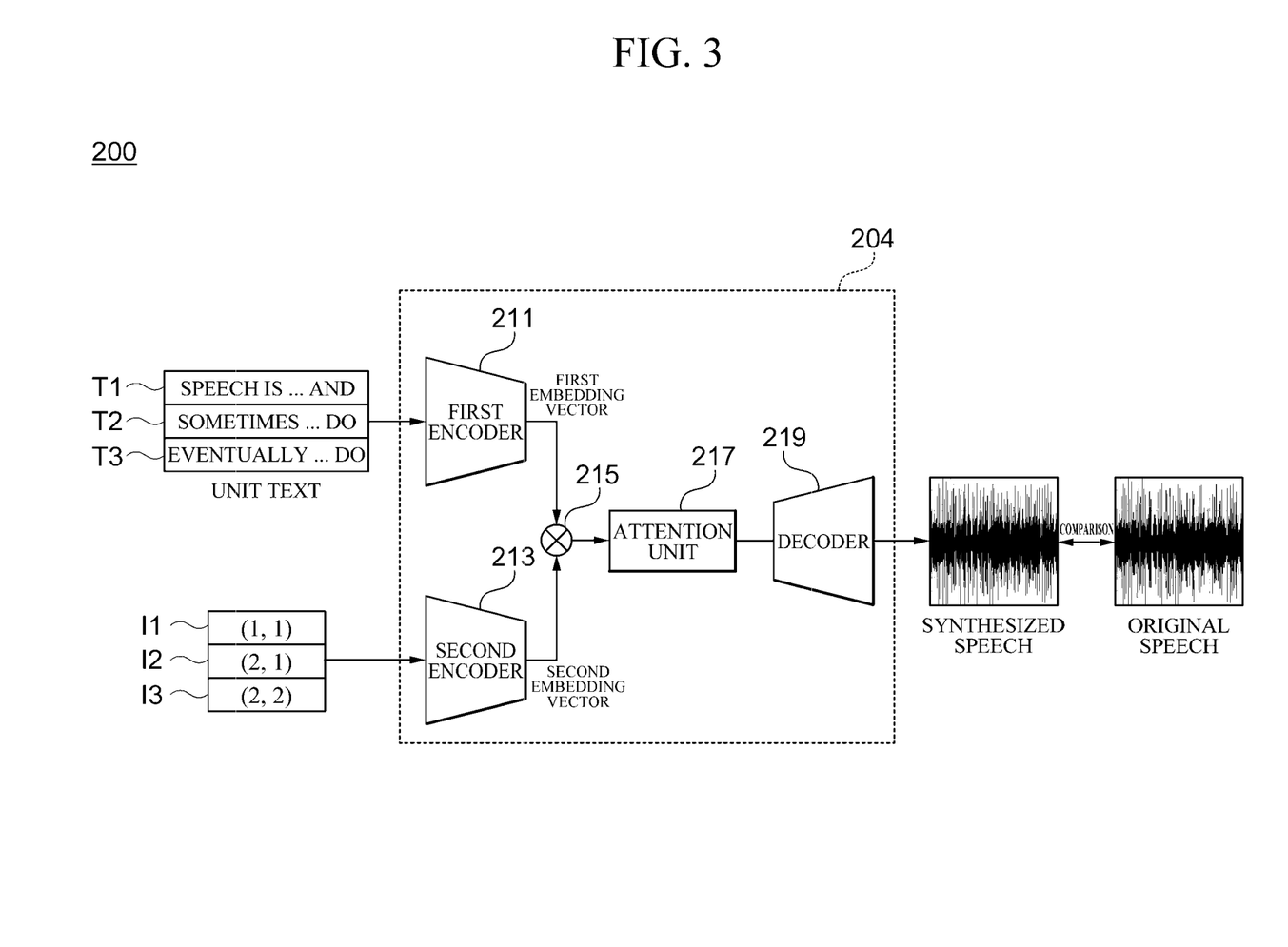
FIG. 3 is a diagram illustrating a configuration of a speech synthesis module in an apparatus for synthesizing speech according to another embodiment of the present invention.

FIG. 3 is a diagram illustrating the configuration of a speech synthesis module 204 in an apparatus for synthesizing speech 200 according to another embodiment of the present invention.

Referring to FIG. 3, the speech synthesis module 204 may include a first encoder 211, a second encoder 213, a combining unit 215, an attention unit 217, and a decoder 219.

The first encoder 211 may receive each unit text (e.g., the first unit text T1, the second unit text T2, and the third unit text T3). The first encoder 211 may generate a token sequence for each unit text input, and generate a first embedding vector for each unit text based on the generated token sequence.

The second encoder 213 may receive classification mark information (first index information I1, second index information I2, and third index information I3) for the classification of each unit text. The second encoder 213 may generate a one-hot encoding vector for classification mark information of each unit text.

For example, when the first index information I1, which is the classification mark information of the first unit text T1 is, (1, 1), the second encoder 213 may generate a one-hot encoding vector of 0101 for the first index information I1.

In addition, when the second index information I2, which is the classification mark information of the second unit text T2, is (2, 1), the second encoder 213 may generate a one-hot encoding vector of 1001 for the second index information I2.

In addition, when the third index information I3, which is the classification display information of the third unit text T3, is (2, 2), the second encoder 213 may generate a one-hot encoding vector of 1010 for the third index information I3.

The second encoder 213 may generate a second embedding vector by embedding the one-hot encoding vector of classification mark information of each unit text. That is, the first encoder 211 may generate the first embedding vector for each unit text, and the second encoder 213 may generate the second embedding vector for classification mark information of each unit text.

The combining unit 215 may generate a combination vector related to each unit text by combining the first embedding vector output from the first encoder 211 and the second embedding vector output from the second encoder 213. In an exemplary embodiment, the combining unit 215 may generate a combination vector by concatenating the first embedding vector and the second embedding vector, but is not limited thereto.

When the combination vector for each unit text is input from the combining unit 215, the attention unit 217 may generate an attention map by determining an attention weight for each unit text. The attention unit 217 may output the combination vector and the attention map for each unit text to the decoder 219.

The decoder 219 may synthesize and output speech for each unit text based on the combination vector and the attention map for each unit text. The decoder 219 may compare synthesized speech with original speech (i.e., speech obtained through utterance of each unit text by a predetermined speaker) and adjust training parameters (e.g., loss function, softmax function, etc.) so that the synthesized speech approximates the original speech.

Figure 4:
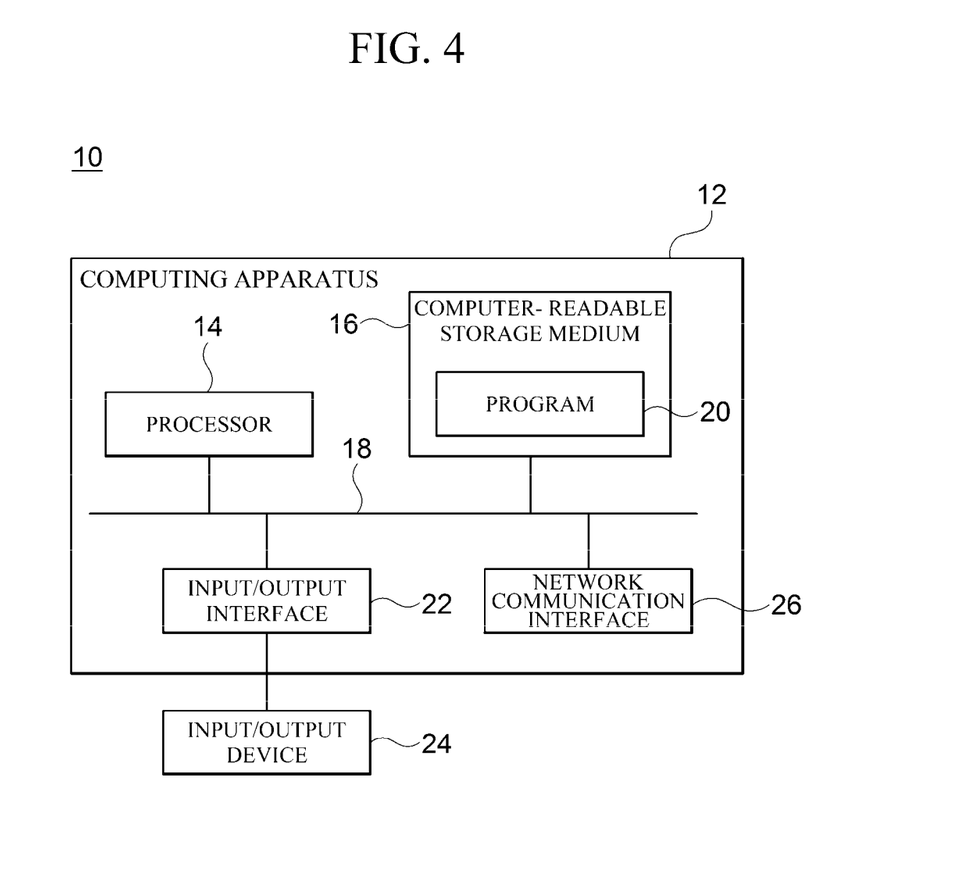
FIG. 4 is a block diagram illustratively describing a computing environment including a computing apparatus suitable for use in exemplary embodiments.

FIG. 4 is a block diagram illustratively describing a computing environment 10 including a computing apparatus suitable for use in exemplary embodiments. In the illustrated embodiment, respective components may have different functions and capabilities other than those described below, and may include additional components in addition to those described below.

The illustrated computing environment 10 includes a computing apparatus 12. In an embodiment, the computing apparatus 12 may be the apparatus for synthesizing speech 100 or 200.

The computing apparatus 12 includes at least one processor 14, a computer-readable storage medium 16, and a communication bus 18. The processor 14 may cause the computing apparatus 12 to operate according to the exemplary embodiment described above. For example, the processor 14 may execute one or more programs stored on the computer-readable storage medium 16. The one or more programs may include one or more computer-executable instructions, which, when executed by the processor 14, may be configured such that the computing apparatus 12 performs operations according to the exemplary embodiment.

The computer-readable storage medium 16 is configured such that the computer-executable instruction or program code, program data, and/or other suitable forms of information are stored. A program 20 stored in the computer-readable storage medium 16 includes a set of instructions executable by the processor 14. In one embodiment, the computer-readable storage medium 16 may be a memory (volatile memory such as a random access memory, non-volatile memory, or any suitable combination thereof), one or more magnetic disk storage devices, optical disk storage devices, flash memory devices, other types of storage media that are accessible by the computing apparatus 12 and capable of storing desired information, or any suitable combination thereof.

The communication bus 18 interconnects various other components of the computing apparatus 12, including the processor 14 and the computer-readable storage medium 16.

The computing apparatus 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing apparatus 12 through the input/output interface 22. The exemplary input/output device 24 may include a pointing device (such as a mouse or trackpad), a keyboard, a touch input device (such as a touch pad or touch screen), speech or sound input device, input devices such as various types of sensor devices and/or photographing devices, and/or output devices such as a display device, a printer, a speaker, and/or a network card. The exemplary input/output device 24 may be included inside the computing apparatus 12 as a component constituting the computing apparatus 12, or may be connected to the computing apparatus 12 as a separate device distinct from the computing apparatus 12.

Although representative embodiments of the present disclosure have been described in detail, those skilled in the art to which the present disclosure pertains will understand that various modifications may be made thereto within the limits that do not depart from the scope of the present disclosure. Therefore, the scope of rights of the present disclosure should not be limited to the described embodiments, but should be defined not only by claims set forth below but also by equivalents to the claims.

What is claimed is:

1. An apparatus for synthesizing speech, which is a computing apparatus that includes one or more processors and a memory storing one or more programs executed by the one or more processors, the apparatus comprising:
a pre-processing module configured to mark a preset classification symbol on each of unit texts input; and
a speech synthesis module configured to receive each unit text marked with the classification symbol and synthesize speech uttering the unit text based on the input unit text,
wherein the pre-processing module includes:
a classification unit configured to classify a position within a sentence and a relationship between sentences for each of unit texts input; and
a classification marking unit configured to mark the classification symbol on each unit text according to the position within the sentence and the relationship between the sentences of each of the unit texts,
wherein the relationship between sentences is regarding what kind of relationship each unit text has with a content of a previous sentence,
wherein the speech synthesis module is trained to synthesize speech of a predetermined speaker according to the position within the sentence and the relationship between the sentences of each of the unit texts, so that speech characteristics of the predetermined speaker according to a context of the predetermined speaker can be reflected in a speech synthesis.

2. The apparatus according to claim 1, wherein the classification unit is configured to classify the position within the sentence with respect to a beginning part and an end part of the unit text; and
the classification marking unit is configured to mark the classification symbol at the beginning part and the end part of the unit text.

3. The apparatus according to claim 2, wherein the unit text is obtained by dividing a sentence into several parts; and
the classification marking unit is configured to omit the classification symbol according to the position within the sentence of the unit text.

4. The apparatus according to claim 1, wherein the speech synthesis module includes:
an encoder configured to receive each of unit texts marked with the classification symbol and generate an embedding vector for each of the unit texts received; and a decoder configured to synthesize speech for each unit text based on the embedding vector for each of the unit texts.

5. The apparatus according to claim 4, further comprising:
an attention unit configured to receive an embedding vector for each unit text from the encoder and generate an attention map by determining an attention weight for each unit text based on the embedding vector,
wherein the decoder is configured to receive an embedding vector and an attention map for each unit text from the attention unit, and synthesize speech for each unit text based on the embedding vector and the attention map.

6. An apparatus for synthesizing speech which is a computing apparatus that includes one or more processors and a memory storing one or more programs executed by the one or more processors, the apparatus for synthesizing speech comprising:
a pre-processing module configured to generate classification mark information for each of unit texts input; and
a speech synthesis module configured to receive each of the unit texts and classification mark information for each unit text and synthesize speech uttering the unit text based on each of the unit texts and the classification mark information,
wherein the pre-processing module includes:
a classification unit configured to classify a position within a sentence and a relationship between sentences for each of the unit texts input; and
a classification marking unit configured to generate the classification mark information according to the position within the sentence and the relationship between the sentences of each of the unit texts,
wherein the relationship between sentences is regarding what kind of relationship each unit text has with a content of a previous sentence,
wherein the speech synthesis module is trained to synthesize speech of a predetermined speaker according to the position within the sentence and the relationship between the sentences of each of the unit texts, so that speech characteristics of the predetermined speaker according to a context of the predetermined speaker can be reflected in a speech synthesis.

7. The apparatus according to claim 6, wherein the classification unit is configured to classify the position within the sentence with respect to a beginning part and an end part of the unit text; and
the classification marking unit is configured to generate the classification mark information with respect to the start part and the end part of the unit text.

8. The apparatus according to claim 6, wherein the speech synthesis module includes:
a first encoder configured to receive each of the unit texts and generate a first embedding vector for each of the unit texts;
a second encoder configured to receive classification mark information for each of the unit texts and generate a second embedding vector for the classification mark information;
a combining unit configured to generate a combination vector by combining the first embedding vector and the second embedding vector; and
a decoder configured to synthesize speech for each of the unit texts based on the combination vector.

9. The apparatus according to claim 8, wherein the classification mark information is indexed according to the classified position within the sentence or relationship between sentences; and
the second encoder is configured to generate a one-hot encoding vector for the classification mark information of each of the unit texts, and generate the second embedding vector by embedding the one-hot encoding vector.

10. The apparatus according to claim 8, further comprising:
an attention unit configured to receive the combination vector for each unit text from the combining unit, and generate an attention map by determining an attention weight for each unit text received,
wherein the decoder is configured to receive a combination vector and an attention map for each unit text from the attention unit, and synthesize speech for each unit text based on the combination vector and the attention map.

11. A method for synthesizing speech performed on a computing apparatus that include one or more processors and a memory storing one or more programs executed by the one or more processors, the method comprising:
an operation of displaying a preset classification symbol on each of unit texts input; and
an operation of receiving each unit text marked with the classification symbol and synthesizing speech uttering the unit text based on the input unit text,
wherein the displaying operation includes:
an operation of classifying a position within a sentence and a relationship between sentences for each of unit texts input; and
an operation of marking the classification symbol on each unit text according to the position within the sentence and the relationship between the sentences of each of the unit texts,
wherein the relationship between sentences is regarding what kind of relationship each unit text has with a content of a previous sentence,
wherein the speech synthesis module is trained to synthesize speech of a predetermined speaker according to the position within the sentence and the relationship between the sentences of each of the unit texts, so that speech characteristics of the predetermined speaker according to a context of the predetermined speaker can be reflected in a speech synthesis.

12. A method for synthesizing speech performed on a computing apparatus that include one or more processors and a memory storing one or more programs executed by the one or more processors, the method comprising:
an operation of generating classification mark information for each of unit texts input; and
an operation of receiving each of the unit texts input and classification mark information for each unit text and synthesizing speech uttering the unit text based on each of the unit texts and the classification mark information,
wherein the generating operation includes:
an operation of classifying a position within a sentence and a relationship between sentences for each of the unit texts input; and
an operation of generating the classification mark information according to the position within the sentence and the relationship between the sentences of each of the unit texts, wherein the relationship between sentences is regarding what kind of relationship each unit text has with a content of a previous sentence, wherein the speech synthesis module is trained to synthesize speech of a predetermined speaker according to the position within the sentence and the relationship between the sentences of each of the unit texts, so that speech characteristics of the predetermined speaker according to a context of the predetermined speaker can be reflected in a speech synthesis.

\* \* \* \* \*